United States Patent [19]
Yoshimura et al.

[11] Patent Number: 5,415,605
[45] Date of Patent: May 16, 1995

[54] POWER TRAIN CONTROL SYSTEM FOR MOTOR-CAR

[75] Inventors: Hiroshi Yoshimura; Keiji Bota, both of Hiroshima, Japan

[73] Assignee: Mazda Motor Corporation, Hiroshima, Japan

[21] Appl. No.: 37,161

[22] Filed: Mar. 25, 1993

[30] Foreign Application Priority Data

Mar. 25, 1992 [JP] Japan ................................. 4-066997

[51] Int. Cl.⁶ ............................................. F16H 61/12
[52] U.S. Cl. ...................................... 477/121; 477/907
[58] Field of Search ...................... 74/866; 364/424.1

[56] References Cited

U.S. PATENT DOCUMENTS

| | | | |
|---|---|---|---|
| 4,417,307 | 11/1983 | Kubo et al. | 364/424.1 OR |
| 4,996,893 | 3/1991 | Nakamura et al. | 74/866 OR |
| 5,101,687 | 4/1992 | Iwatsuki et al. | 74/866 X |
| 5,216,938 | 6/1993 | Yamaguchi | 74/866 OR |
| 5,230,256 | 7/1993 | Oizumi et al. | 74/866 OR |

FOREIGN PATENT DOCUMENTS 2-221658  9/1990  Japan .

*Primary Examiner*—Dirk Wright
*Attorney, Agent, or Firm*—Keck, Mahin & Cate

[57] ABSTRACT

A power train control system includes an automatic transmission shift control which detects an operational failure of an electric throttle valve based on an electric throttle opening. The transmission shift control governs or controls shifting of the automatic transmission, based on an electric throttle opening and a vehicle speed when no operational failure of the electric throttle valve is detected and based on a composite opening of an electric throttle opening and a mechanical throttle opening and a vehicle speed when operational failure of the electric throttle valve is detected.

4 Claims, 7 Drawing Sheets

POWER TRAIN CONTROL SYSTEM FOR MOTOR-CAR

BACKGROUND OF THE INVENTION

1. Field of the Invention

This invention relates to a control system for a power train including an engine and a transmission, and, more particularly, to a control system for a power train including an engine, which is associated with a mechanical throttle valve and an electric throttle valve, and an automatic transmission.

2. Description of Related Art

Conventionally, automobile engines are provided with throttle valves which are opened in accordance with depressed strokes of an accelerator pedal so as to control the amount of intake air, i.e. the output torque of the engine. Such a throttle valve is mechanically coupled to an accelerator pedal by means of a wire or rod so as to be opened and closed in accordance with depressed strokes of the accelerator pedal. These types of throttle valves are conventionally well known in the art and are referred to as mechanical throttle valves.

Ordinarily, with such a mechanical throttle valve, the opening of the throttle valve is proportional to the depressed stroke of the accelerator pedal. However, with regard to intake air, the amount of intake air generally changes at relatively great rates for small depressed strokes of the accelerator pedal and tends to changes at small rates for large depressed strokes of the accelerator pedal. When depressing the accelerator pedal beyond a predetermined specific stroke, the amount of intake air does not increase. Hence, if utilization is made of only a mechanical throttle valve, it is actually very difficult to provide an engine output directly proportional to a depressed stroke of the accelerator pedal.

If the characteristic of engine output relative to the stroke of the accelerator pedal can be properly established to correspond to vehicle driving conditions, then a measurable improvement can be accomplished in the performance of driving force. However, with the mechanical throttle valve, once the change in opening of the mechanical throttle valve relative to the stroke of an accelerator pedal is established, it remains fixed and can not be varied. Consequently, it is difficult to variably obtain an appropriate engine output relative to vehicle driving conditions.

From this background, there has been proposed an electromagnetic actuator for opening and closing the throttle valve. With this type of throttle valve, an opening of the throttle valve is controlled in accordance with a control signal corresponding to a depressed stroke of the accelerator pedal so as to provide an amount of intake air, and hence engine output torque, directly proportional to the opening. By the aid of this type of electric throttle valve, the opening of the throttle valve, and hence the engine output, relative to the stroke of the accelerator pedal is variably established by modifying of an electric signal. Such an electric throttle valve is known from, for instance, Japan Unexamined Patent Publication No. 2-221658.

Where utilization of this type of electric throttle valve is adopted, then improved reliability can be obtained through the use of a combination of a mechanical throttle valve and an electric throttle valve. In such a set-up, because of a high reliability, the mechanical throttle valve serves as a primary or main throttle valve, and the electric throttle valve serves as a secondary or supplemental throttle valve. For instance, the mechanical throttle valve and the electric throttle valve are aligned in series in an intake passage of the engine. Such an arrangement is known from, for instance, Japan Unexamined Patent Publication No. 2-221658.

By means of controlling of the amount of air taken these two throttle valves arranged in the intake passage, an excellent engine response can be obtained corresponding to the stroke of the accelerator pedal. Moreover, the engine output can be controlled much more precisely by the combination of these valves than by the conventional throttle valve. In addition, the combination of these valves enables the precise coordination of changes in engine output so as to respond to vehicle driving conditions.

When a power train is constructed with an engine endowed with these two throttle valves and an automatic transmission, precise control exerted over the engine output can be utilized so as to realize a substantially improved feeling in shifting of an automatic transmission. That is, when the automatic transmission upshifts chronologically, for instance, from a first gear to a fourth gear, if the accelerator pedal remains stationary, a drop in engine output torque ordinarily occurs following each upshift. In other words, there is an unavoidable occurrence of torque shock accompanying each upshift of the automatic transmission. Such shift shock adversely affects to feelings of shifting of the automatic transmission.

In an attempt to eliminate this problem, in the power train described above, an electronic throttle valve has a valve opening characteristic different for various gears of the automatic transmission. The throttle valve is restrictively regulated in opening to be slightly smallish prior to shifting up of the automatic transmission so as to restrict the driving force of the power train to some extent in a lower gear, for instance the first gear, prior to the upshifting. On the other hand, after shifting up of the automatic transmission, the electric throttle valve is regulated in opening to be largish so as to increase the driving force of the power train in a higher gear, for instance the second gear, following the upshifting. In such a way, torque shock is mitigated during upshifting with a resultant improvement in shift feelings. It is general, even for the power trains which includes engines provided with two throttle valves disposed in intake lines, to provide gear shift control schedules on the basis of opening of the mechanical throttle valve and speed of the drive system (i.e. vehicle speed) in order to defer as much as possible to the intentions or desires of vehicle drivers.

However, in a power train in which torque control during shifting is accomplished by appropriately controlling the opening of an electric throttle valve, if the electric throttle valve is operationally impeded due, for instance, to trouble of an actuator, then, the torque control during shifting can not be appropriately accomplished, which constitutes a source of instability in shift control. Especially, in a power train in which the opening of the electric throttle valve is set to be smaller or less than the opening of the mechanical throttle valve for engine output torque restriction, if the electric throttle is impeded or causes an operational failure at large openings, the output torque of the engine cannot be effectively restricted, making shift control unstable.

In addition, automatic transmissions of the type having a so called "overdrive mode," in which engine speed is increased and transmitted to wheels, can not transmit fully the engine output torque to the wheel owing to the torque transmissive capacity or clutch capacity of transmission mechanisms. For this reason, a power train including such an automatic transmission is controlled to restrict the engine output torque so as not to exceed the torque transmissive capacity of transmission mechanism.

When the power train is comprised of this type of automatic transmission and an engine which has two throttle valves disposed in an intake line, ordinarily, by restrictively controlling the electric throttle valve in opening to be smallish, cutting or restriction of the engine output torque is exercised in the overdrive mode. However, with this type of power train, if the electric throttle valve is operationally impeded at large openings, the torque cutting control can not be effectively exercised over the overdrive mode.

SUMMARY OF THE INVENTION

It is therefore an object of the present invention to provide a control system for a power train including an engine, which is associated with a mechanical throttle valve and an electrical throttle valve, and an automatic transmission, which exercises shifting of the automatic transmission with a high stability, even if the electric throttle valve operationally fails.

The foregoing object of the present invention is accomplished by providing a control system for a power train having an engine and an automatic transmission, which has a mechanical throttle valve and an electric throttle valve disposed in an intake line. The power train control system includes an automatic transmission shift control means which detects an operational failure of the electric throttle valve based on an electric throttle opening. The control system governs or controls, on one hand, shifting of the automatic transmission based on an electric throttle opening and a vehicle speed when detecting no operational failure of the electric throttle valve and, on the other hand, shifting of the automatic transmission based on an composite opening of an electric throttle opening and a mechanical throttle opening and a vehicle speed when detecting an operational failure of the electric throttle valve.

Specifically, the electric throttle valve is changed in opening differently in accordance with gears into which the automatic transmission is shifted and in each of which an opening of the electric throttle valve is established smaller than an opening of the mechanical throttle valve. The power train control system restricts opening of the electric throttle valve so as to restrict output torque of the engine less than a predetermined torque when the automatic transmission is in an overdrive mode. Further, it prohibits shifting of the automatic transmission into the overdrive mode when the automatic transmission is in a range of high engine loads if an operational failure of the electric throttle valve is detected.

When the electric throttle valve becomes operationally failed, by means of the control system, shifting of the automatic transmission is accomplished on the basis of the composite opening of an opening of the failed electric throttle valve and an opening of the mechanical throttle valve, and a speed of the vehicle drive system or a vehicle speed. Through the utilization of the composite opening, which reflects not only the opening of the mechanical throttle valve, but also that of the failed electric throttle valve, unlike the conventional art in which shifting of the automatic transmission is accomplished on the basis of only an opening of the mechanical throttle valve and a vehicle speed in the same manner as when the electric throttle valve is normally operating, it is possible to conduct shift controls corresponding to engine output torque. In other words, even when an operational failure occurs int the electric throttle valve, shifting of the automatic transmission is accomplished in a relatively stable operation, with minimal negative influence being exerted on driving of the vehicle.

When the electric throttle valve is adapted to manifest different characteristics with respect to its openings for shiftable gears of the automatic transmission, the control system conducts shifting of the automatic transmission on the basis of a composite opening and a vehicle speed on an accidental operational failure of the electric throttle valve, so as to control shifting of the automatic transmission corresponding to engine output.

When the electric throttle valve is adapted to provide an opening smaller than that of the mechanical throttle valve in order to restrict engine output torque, then, if an operational failure occurs in the electric throttle valve, controlling shifting of the automatic transmission on the basis of a composite opening and a vehicle speed avoids deterioration in shift feelings which is caused by an inadequate restriction in engine output torque due to a failure of the electric throttle valve and, accordingly, effectively accomplishes stable automatic transmission shift control.

Further, the control system, which restricts engine output torque to a level below a specific output torque by restricting of opening of the electric throttle valve when the automatic transmission is in the overdrive mode, prohibits upshifting of the automatic transmission into the overdrive mode in a range of higher engine loads if an operational failure occurs in the electric throttle valve. Accordingly, when in fact the electric throttle valve becomes failed at large openings, the transmission of an excessive torque, greater than the transmissive capacity of the automatic transmission in the overdrive mode, is effectively avoided.

BRIEF DESCRIPTION OF THE DRAWINGS

The above and other objects and features of the present invention will be clearly understood from the following detailed description with respect to preferred embodiments thereof when considered in conjunction with the accompanying drawings, in which.

DETAILED DESCRIPTION OF THE PREFERRED EMBODIMENT

Because power trains are well known, the present description will be directed in particular to elements forming part of, or cooperating directly with, apparatus in accordance with the present invention. It is to be understood that parts or elements not specifically shown or described can take various forms well known to those skilled in the automobile art.

Figure 1:
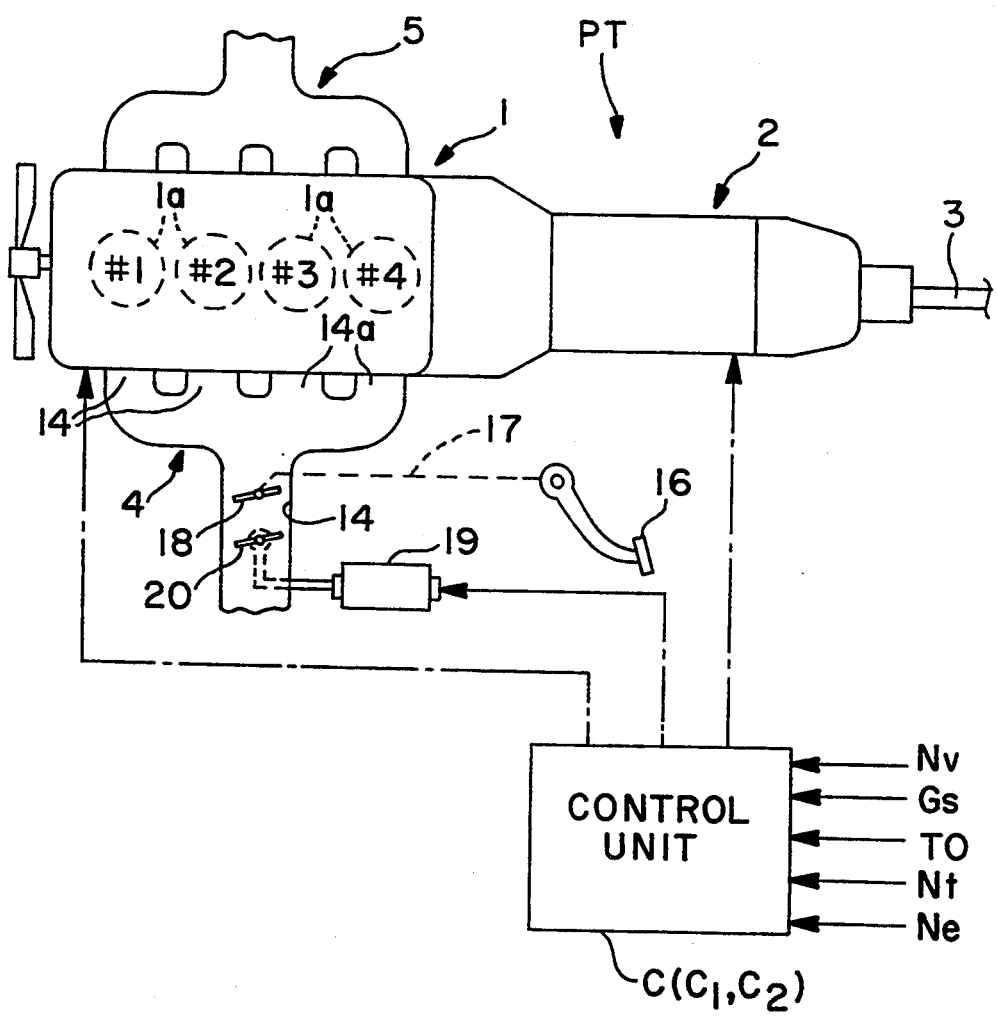
FIG. 1 is a schematic illustration showing a power train which is endowed with a control system in accordance with a preferred embodiment of the present invention.
Figure 2:
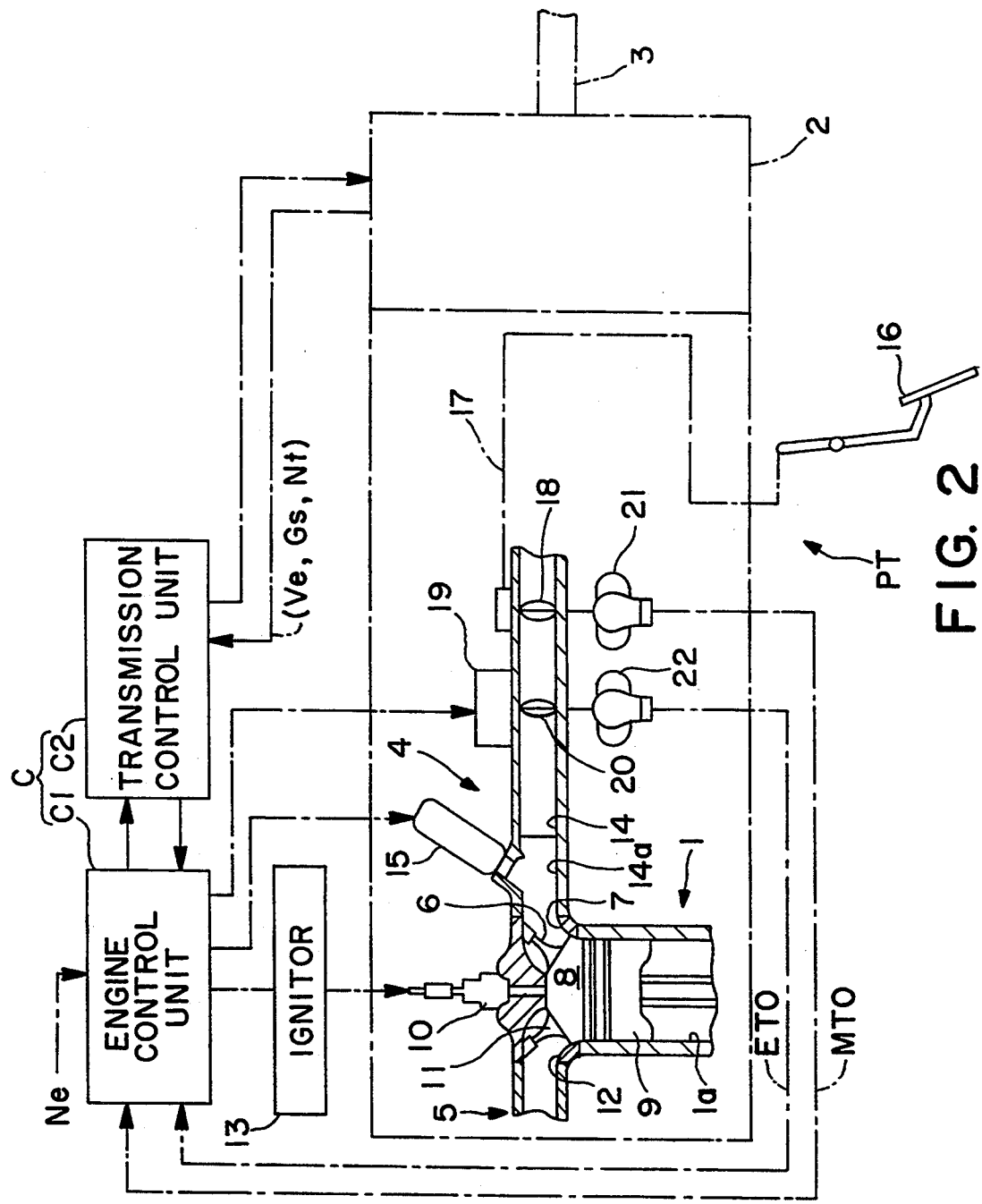
FIG. 2 is a block diagram showing a control system of the power train of FIG. 1.

Referring to the drawings in detail, and in particular, to FIGS. 1 and 2, a power train PT controlled by a control system in accordance with a preferred embodiment of the present invention is shown, which includes an in-line four cylinder internal combustion engine 1 and an automatic transmission 2 coupled to the engine 1 through a torque converter (not shown). These elements of the power train are well known in structure and operation and take any known forms. The engine output torque is varied through the torque converter and a planetary gear type of transmission gear mechanism (not shown) of the automatic transmission 2 and is transmitted is to drive wheels (not shown) through an output shaft 3 of the automatic transmission 2. The engine 1 is provided with an intake system 4 for introducing air into the engine 1 and an exhaust system 5 for discharging burned gases from the engine 1.

In each cylinder 1a of the engine 1, during opening of an intake valve 6, a fuel mixture is introduced into a combustion chamber 8 through an individual intake passage 14a via an intake port 7 and is compressed by a piston 9. Following the compression of fuel mixture, a spark plug 10 provides a spark so as to ignite and burn the fuel mixture. During opening of an exhaust valve 11, the burned gases are expelled from the combustion chamber 8 through an exhaust port 12. In this instance, in a well known manner an ignitor 13 provides ignition pulses to the spark plugs 10 of all of the cylinders 1a at specified times. Adjacent to the intake port 7 the engine 1 is provided with a fuel injector 15 in the individual intake passage 14a for injecting fuel into air in the vicinity of the intake ports 7.

There is disposed a mechanical throttle valve 18 in a common intake passage 14 to which all of the individual intake passages 14a, defined upstream from the injectors 15, are collectively joined. The mechanical throttle valve 18 is operationally coupled to an accelerator pedal 16 by means of a mechanical link mechanism 17, and the opening of the mechanical throttle valve 18 is detected by a throttle opening sensor 21. Slightly downstream from the mechanical throttle valve 18 there is an electric throttle valve 20, disposed in the common intake passage 14, which is opened and closed by means of an electronic actuator 19 whose opening is detected by a throttle opening sensor 22. The electronic actuator 19 regulates the opening of the electric throttle valve 20 following a signal impressed from an engine control unit $C_1$ as will be described in detail later.

The operation of the power train PT is controlled by a control unit C, comprising an internal microcomputer, which includes an engine control unit $C_1$ and a transmission control unit $C_2$. In this instance, the engine control unit $C_1$ carries out various controls, such as a time control of ignition by the ignitor 13, a control of fuel injection by the fuel injector 15, a control of valve opening of the electric throttle valve 20, and a control of torque down of the engine. These controls are performed based on various control information provided from the throttle opening sensors 21 and 22 and the transmission control unit $C_1$. Controlling of opening and closing of the electric throttle valve 20 is accomplished by following an opening schedule map which defines schedules of opening of the electric throttle valve 20 predetermined for the respective gears of the automatic transmission 2 and stored in a read only memory (ROM) of the engine control unit $C_1$. Each mapped schedule provides openings of the electric throttle valve 20 (i.e. engine output characteristics) corresponding to openings of the mechanical throttle valve 16 (i.e. the stroke of depression of the accelerator pedal 16).

In this power train control system, in order to prevent the automatic transmission 2 from causing a deterioration of gear shift feeling due to a torque drop, i.e. shift shock, following each shifting up, before shifting up of the automatic transmission 2, the opening of the electric throttle valve 20 is established to be relatively constricted so as to restrict a driving force in a gear, from which the up-shift takes place, for instance the first gear, to some extent. On the other hand, after shifting up of the automatic transmission 2, the opening of the electric throttle valve 20 is established to be relatively large so as to increase a driving force in a gear, resulting from the up-shift, for instance the second gear to some extent. In this manner, a torque shock accompanying up-shifting of the automatic transmission 2 can be mitigated, thereby improving the feeling of gear shift.

Figure 3:
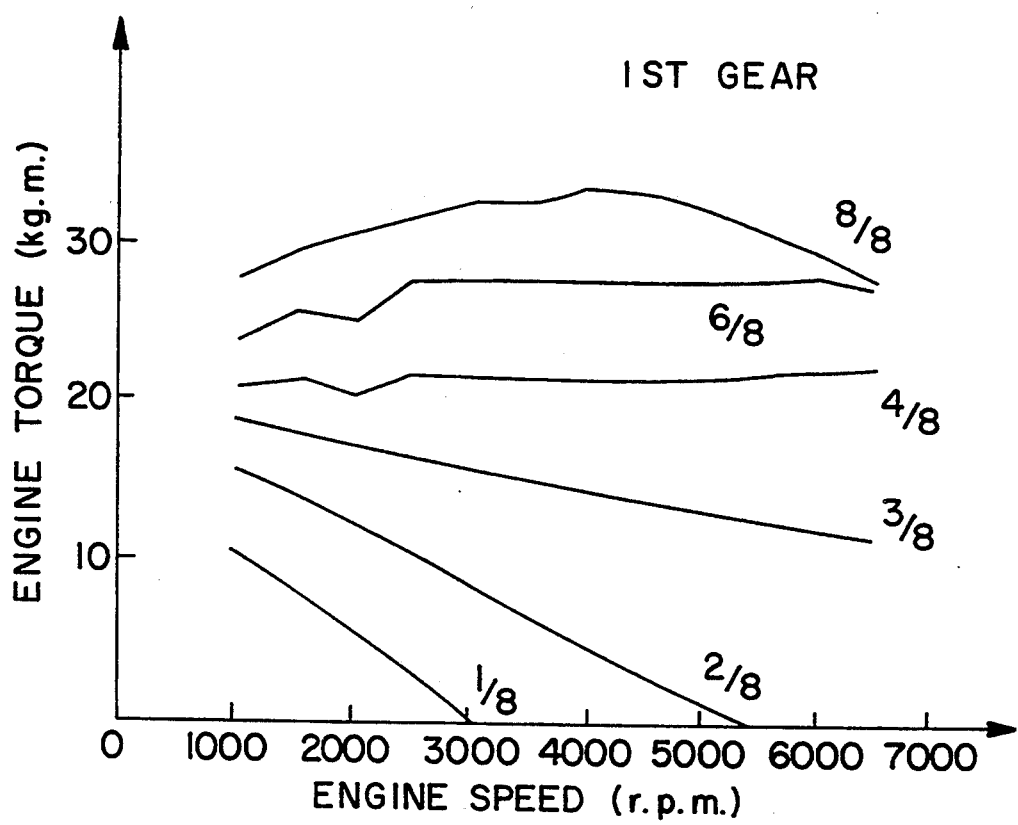
FIG. 3 is a diagram showing the engine output characteristics with respect to engine speed when control is exercised over an electric throttle valve following a throttle opening control map for a first gear.
Figure 4:
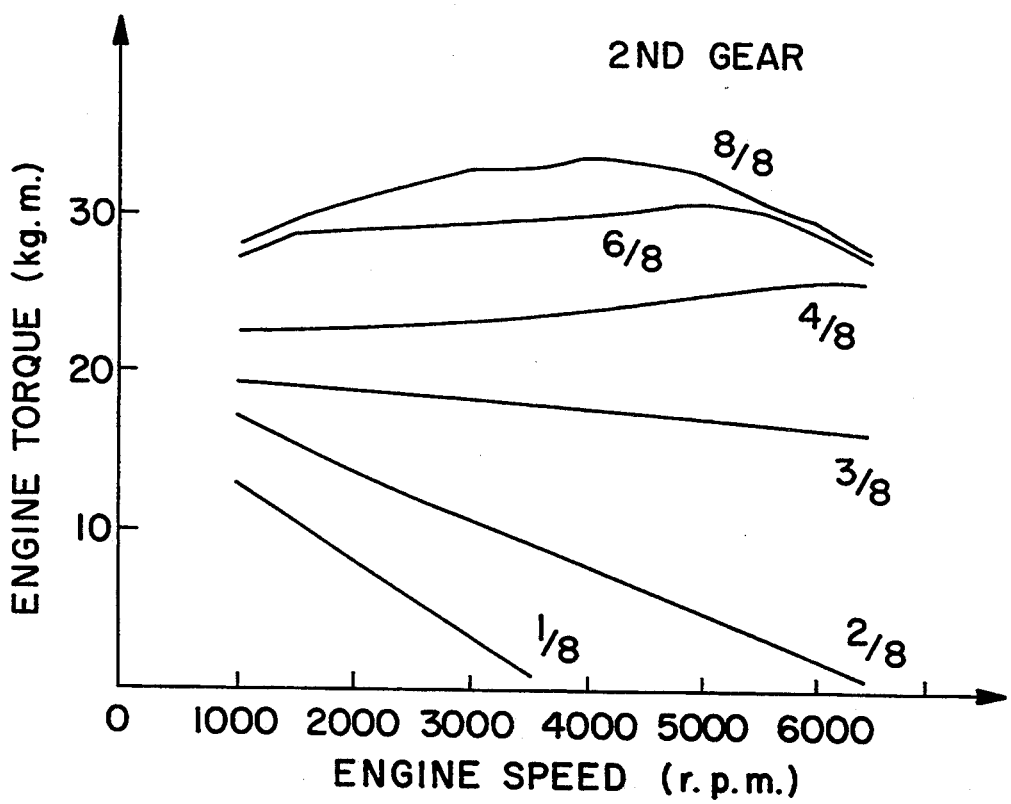
FIG. 4 is a diagram showing the engine output characteristics with respect to engine speed when control is exercised over an electric throttle valve following a throttle opening control map for a second gear.
Figure 5:
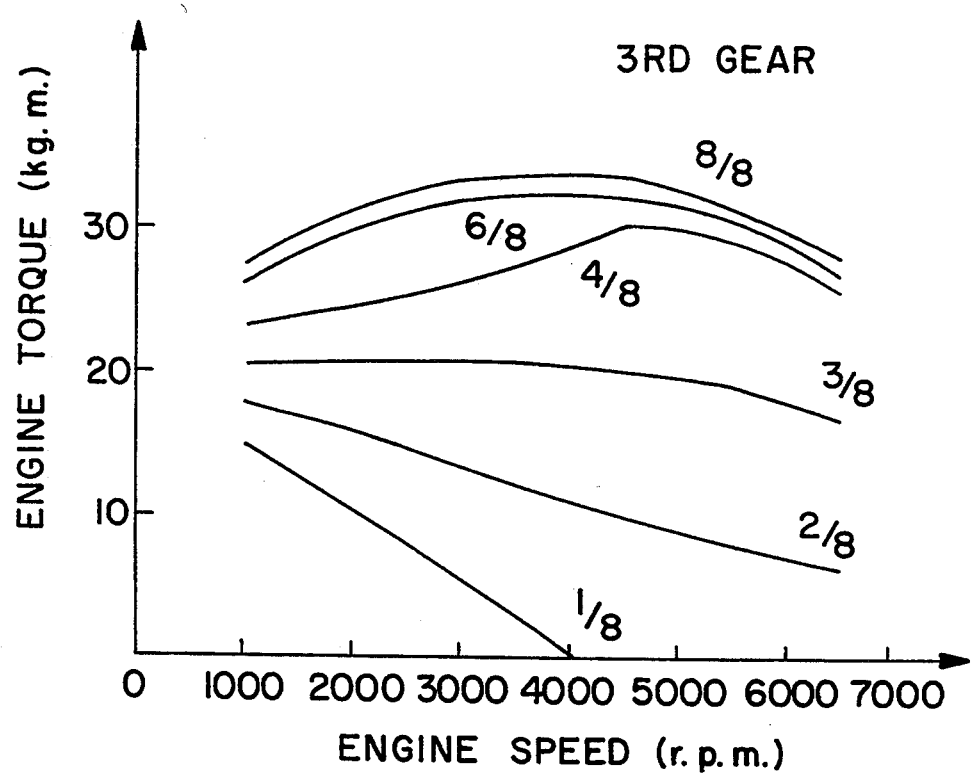
FIG. 5 is a diagram showing the engine output characteristics with respect to engine speed when control is exercised over an electric throttle valve following a throttle opening control map for a third gear.

In other words, the opening of the electric throttle valve 20 is differently established for the respective gears. Specifically, the throttle opening schedule map provides opening schedules for the first to third gears such that an opening of the electric throttle valve 20, and hence an engine output, smaller for a lower gear that for a higher gear. FIGS. 3–5 show examples of engine output torque relative to engine speed for the first–third gears when opening of the electric throttle valve 20 is accomplished by following these schedules defined in the throttle opening schedule map. In FIGS. 3–5, openings of the mechanical throttle valve 18, such as 1/8–8/8, are used to indicate output torque of the engine 1 relative to speed of the engine 1. For example, when the mechanical throttle valve 18 is opened to an opening of 1/8 and the engine 1 operates at a speed of 1,000 rpm, then, the output torque of the engine 1 is approximately 10 kg/m in the first gear, approximately 13 kg/m in the second gear, and approximately 14 kg/m in the third gear. As apparent from FIGS. 3–5, the output torque of the engine is lower in a lower gear than in a higher gear.

In addition, the automatic transmission 2 is not able to fully transmit an output torque of the engine 1 owing to the torque transmissive capacity, or clutch capacity, of the transmission gear mechanism in an overdrive mode, i.e. a fourth gear, for increasing and transmitting an engine speed to the drive wheels. For this reason, the throttle opening schedules are established so as to provide an engine output torque not exceeding the torque transmissive capacity, i.e. to cut engine output torque. Such a torque cut is accomplished by controlling the opening of the electric throttle valve 20 rather to be smaller.

The transmission control unit $C_2$ controls shifting of the automatic transmission 2 in accordance with vehicle driving conditions based on control information, such as various control signals representative of a vehicle speed, a selected gear and a turbine speed of the torque converter, which are obtained from sensors (not shown and well known in the art), and a signal representative of a throttle opening provided from the engine control unit $C_1$. Further, it makes a determination of a timing at which a torque down must be caused during shifting and provides a signal of the timing to engine control unit $C_1$.

Shift control of the automatic transmission 2 is accomplished on the basis of a shift schedule map which is established so as to accomplish a gear shift corresponding to a speed of the drive system, i.e. a vehicular speed, and an engine load, i.e. a throttle opening. Specifically, in this embodiment, the shift control is accomplished in accordance with an ordinary shift schedule map when the electric throttle valve 20 operates without any operational failure. On the other hand, when the electric throttle valve 20 has become inoperable due, for instance, to a cling of the actuator 19 and fixes at an opening, a shift schedule map may be substituted by another shift map corresponding to the fixed opening of the electric throttle valve 20 so as to restrict shifting of the automatic transmission 2 to an undesired gear, thereby preventing a negative influence on driving of the vehicle. In addition, particularly, if the electric throttle valve 20 is impeded at middle openings, shift control of the automatic transmission 2 is accomplished on the basis of a composite opening of the openings of the electric throttle valve 20 and the mechanical throttle valve 18 and a speed of the drive system, i.e. a vehicular speed.

Figure 6:
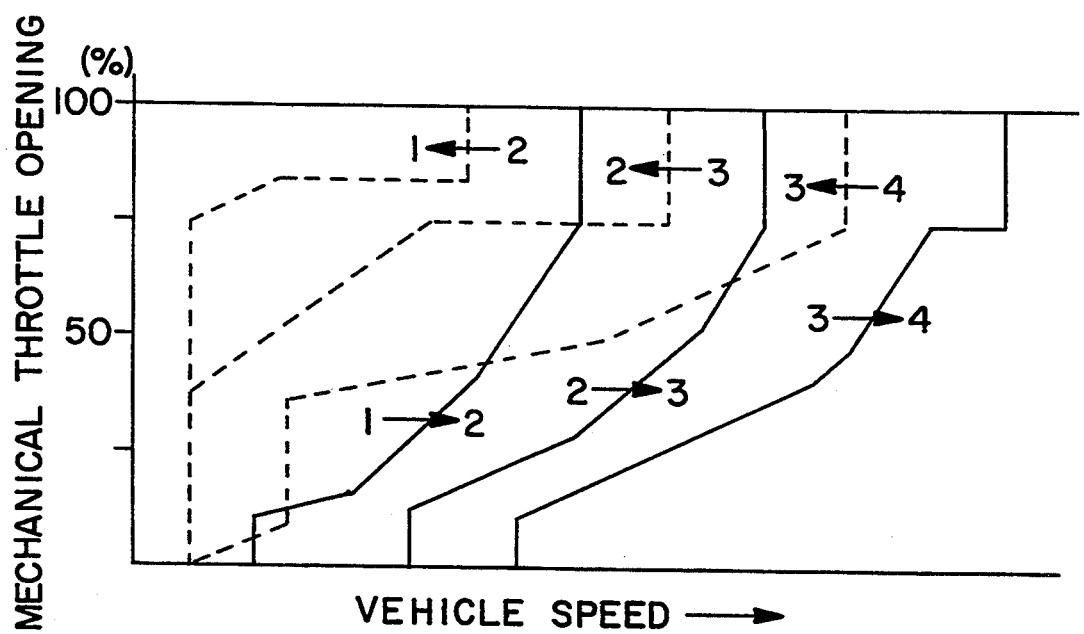
FIG. 6 is a diagram showing a transmission shift pattern used for the electric throttle valve operating normally.

As is shown in FIG. 6, the ordinary shift schedule map utilized in ordinary driving conditions provides gear shift schedules defined on the basis of vehicle speed and opening of the mechanical throttle valve 18. Fundamentally, the first gear is utilized in a region of lower vehicle speeds and higher engine loads. With an increase in vehicle speed or a reduction in mechanical throttle opening, upshifting is accomplished from the second gear to the third gear, and to the fourth gear or overdrive mode. Conversely, in accompaniment to a reduction in vehicle speed, or to an increases in mechanical throttle opening, downshifting toward a lower gear takes place. In order to prevent frequent upshifting and downshifting of the automatic transmission 2 in a boundary region, downshift schedules depicted by broken lines are established on a side of lower speed and higher load than upshift schedules. In other words, a hysteresis is provided between upshifting and downshifting.

Figure 7:
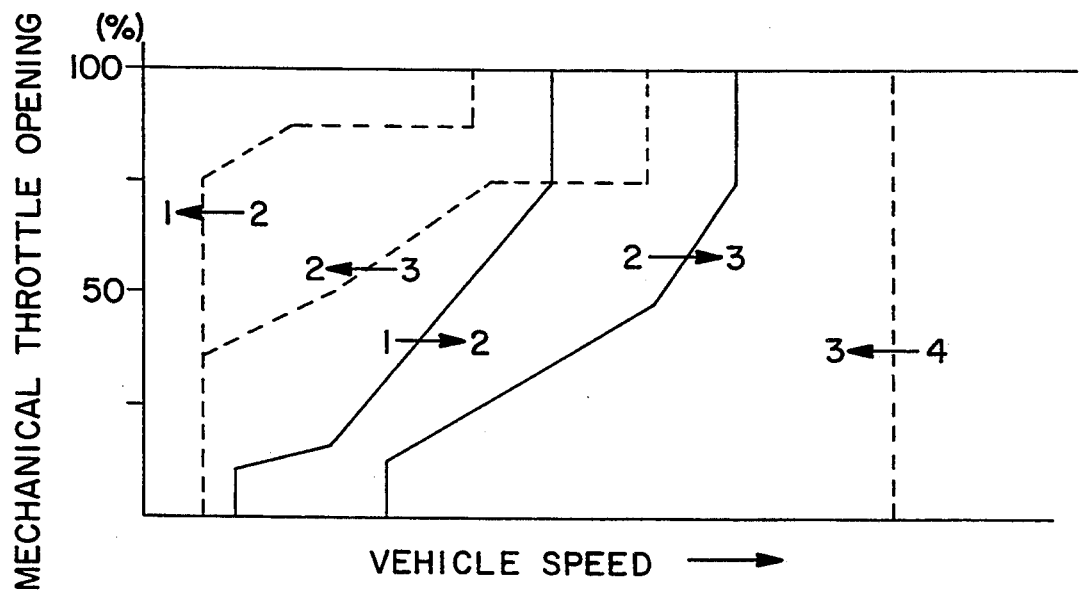
FIG. 7 is a diagram showing a transmission shift pattern used for the electric throttle valve operationally failed at large openings.

If the electric throttle valve 20 is operationally impeded at large openings, shifting of the automatic transmission 2 is accomplished on the basis of the on-failure gear shift schedule map (I) shown in FIG. 7, which is provided only for large openings. The on-failure gear shift schedule map (I) is not given a gear shift schedule for upshifting from the third gear to the fourth gear, i.e. the overdrive mode, so as to eliminate the third to fourth gear upshifting. In other words, when the electric throttle valve 20 is operationally impeded at a large opening, the third into fourth gear shifting is prohibited. Accordingly, even if the electric throttle valve 20 is operationally blocked at a large opening and, thereby, controlling of torque cut can not be accomplished in vehicle driving conditions for the overdrive mode, the automatic transmission 2 is effectively prevented from transmitting torque in excessive beyond the torque transmissive capacity of the clutch in the overdrive mode.

Figure 8:
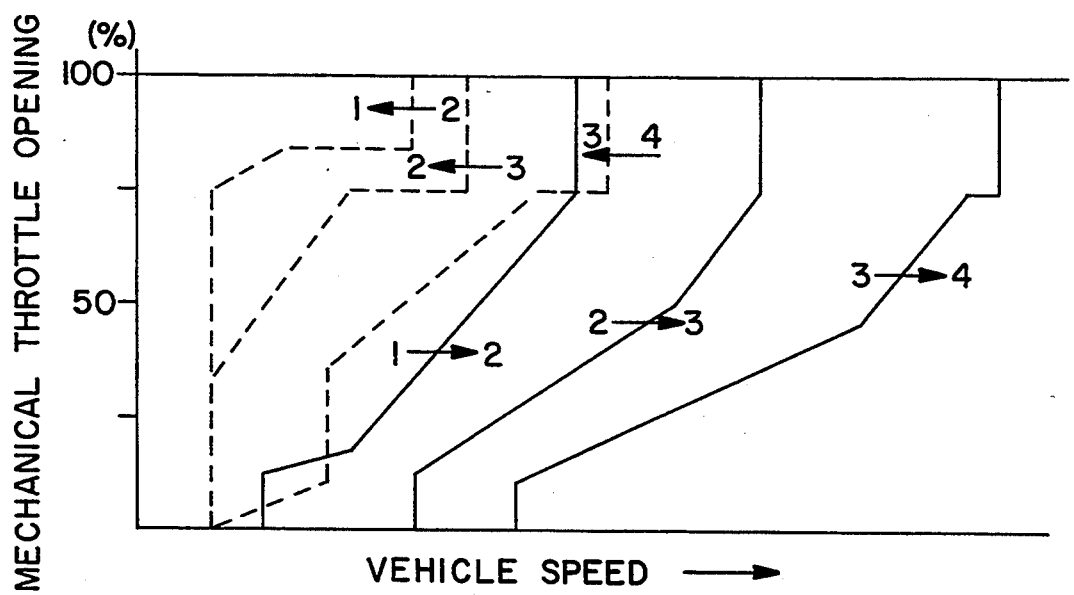
FIG. 8 is diagram showing a transmission shift pattern used for the electric throttle valve operationally failed at small openings.

On the other hand, if the electric throttle valve 20 is operationally impeded at small openings, shifting of the automatic transmission 2 is accomplished on the basis of the on-failure gear shift schedule map (II) shown in FIG. 8. In comparison with the ordinary gear shift schedules of FIG. 6, gear shift schedules for downshifting are entirely moved toward a side of lower vehicle speeds so as to greatly restrict downshifting in a region of high vehicle speeds. In other words, even if the driver depresses down the accelerator pedal 16 with a feeling of insufficient torque while the electric throttle valve 20 is operationally blocked at a small opening, downshifting of the automatic transmission 2 is limited. Particularly, downshifting of the automatic transmission 2 unsuitable in the region of high vehicle speeds is positively prevented, resulting in greatly increasing safety. These on-failure gear shift schedule maps (I) and (II) are defined with respect to mechanical throttle openings and vehicle speeds.

Figure 9:
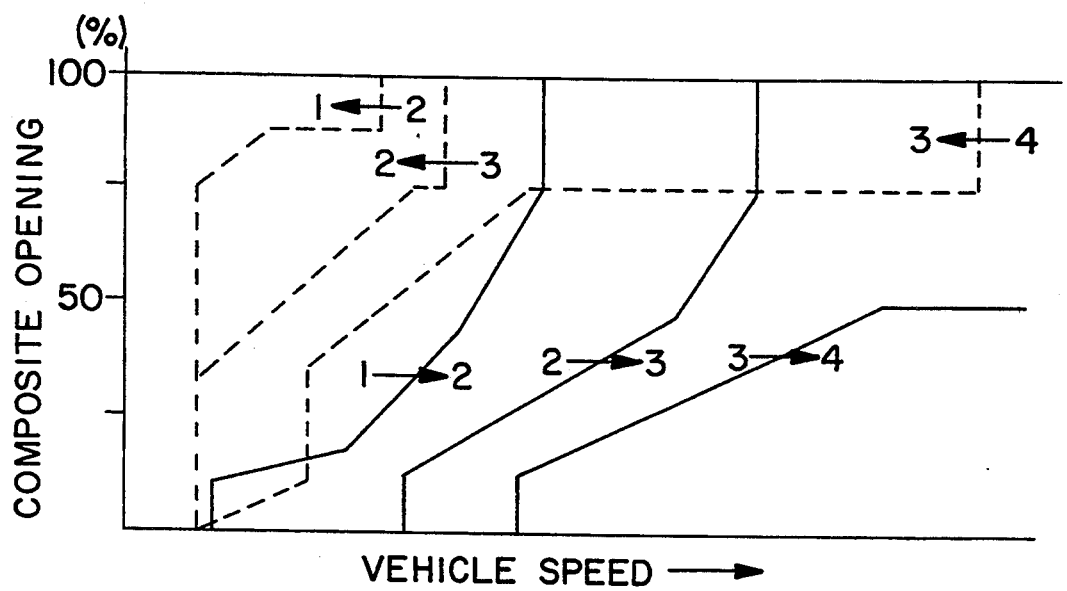
FIG. 9 is diagram showing a transmission shift pattern used for the electric throttle valve operationally failed at small openings.
Figure 10:
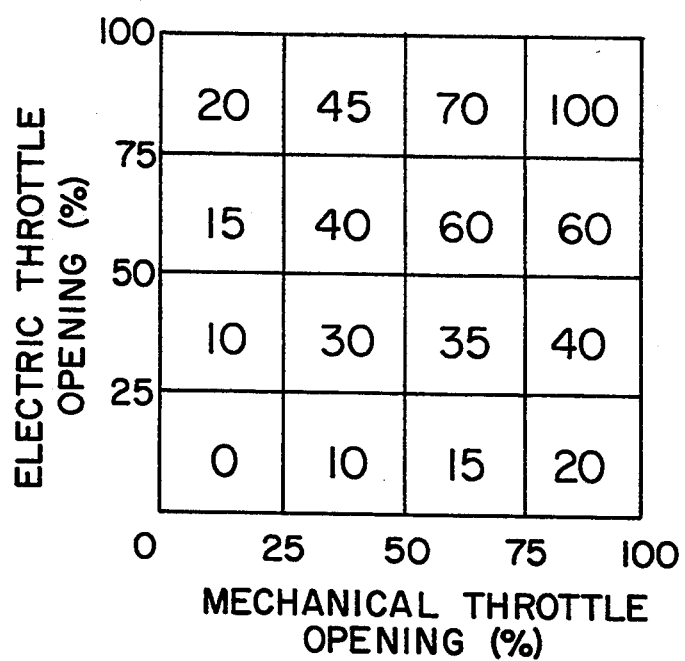
FIG. 10 is a composite opening map of composite openings of ann electric throttle valve opening and mechanical throttle valve opening.

Further, if the electric throttle valve 20 is operationally impeded at middle openings, shifting of the automatic transmission 2 is accomplished on the basis of the on-failure gear shift schedule map (III) shown in FIG. 9. In this gear shift schedule map, gear shift schedules are defined with respect to the composite openings of mechanical throttle openings and electric throttle openings and vehicle speeds. This composite openings are given in percentage (%) on the basis of the composite opening map such as shown in FIG. 10. The composite openings are generally restricted so that they are smaller than mechanical throttle openings. For example, when the electric throttle valve 20 is operationally impeded at an opening between 25–40% of its full opening, then the selection of a composite opening is made using the second-from-bottom column of the composite opening map shown in FIG. 10, and one of 10, 30, 35 and 40% of openings according to a mechanical throttle opening. That is, in this instance, the composite opening is determined as a composite opening of 35% if the opening of the mechanical throttle valve 18 is, for example, 60% of its full opening, and as a composite opening of 40% if the opening of the mechanical throttle valve 18 is 100% of its full opening.

In this manner, with utilization of the composite openings in lieu of openings of the mechanical throttle value 18, according to openings at which the electric throttle valve 20 is operationally impeded, composite openings are generally established on a side of openings smaller than openings of the mechanical throttle valve 18. In other words, the shift control of the automatic transmission 2 is enabled in reflection of not only a mechanical throttle opening but also an opening of the electric throttle valve 20 functionally disordered. Accordingly, even when the electric throttle valve 20 is functionally disordered, the shift control of the automatic transmission 2 is accomplished with a relative stability.

The on-failure gear shift schedule map (III) is characterized by a combination of the on-failure gear shift maps (I) and (II). Specifically, if an composite opening exceeds a specified opening of, for example, 50%, then the shift schedule is flat for an upshifting from the third gear to the fourth gear. Therefore, in a range in which an engine load is higher than that indicated by the composite opening of 50%, the automatic transmission 2 is disabled to shift from the third gear to the fourth gear. In other words, if the electronic throttle valve 20 is impeded at middle openings, shifting from the third to the fourth gear (the overdrive mode) is prohibited at engine loads above a specified load. Accordingly, if the automatic transmission 2 is positively prevented from transmitting a torque beyond the torque transmissive capacity of the clutch in the overdrive mode.

Furthermore, the on-failure gear shift schedule map (III), as well as the on-failure gear shift schedule map (II), provides downshift schedules shifted generally toward lower vehicle speeds in comparison with the downshift schedules provided in the ordinary gear shift schedule map shown in FIG. 6 so as to greatly restrict downshifting of the automatic transmission 2 at higher vehicle speeds. As seen in FIG. 9, the gear shift schedule for the fourth to third downshift in a region of high engine loads is shifted to a side of higher vehicle speeds for the reason of providing less chances of drive in the fourth gear. The operation of the control system for the power train PT depicted in FIGS. 1 and 2 will be hereafter described with reference to FIG. 11, which is a flow chart illustrating a catalyst deterioration detection control routine in the case of failure of the electric throttle valve for the microcomputer of the control unit C. Programming a computer is a skill well understood in the art. The following description is written to enable a programmer having ordinary skill in the art to prepare an appropriate program for the microcomputer. The particular details of any such program would of course depend upon the architecture of the particular computer selected. Because the engine control unit $C_1$ and the transmission control unit $C_2$ are components of the control unit C, they are hereafter inclusively described as the control unit C excepting they must be significantly referred.

Figure 11:
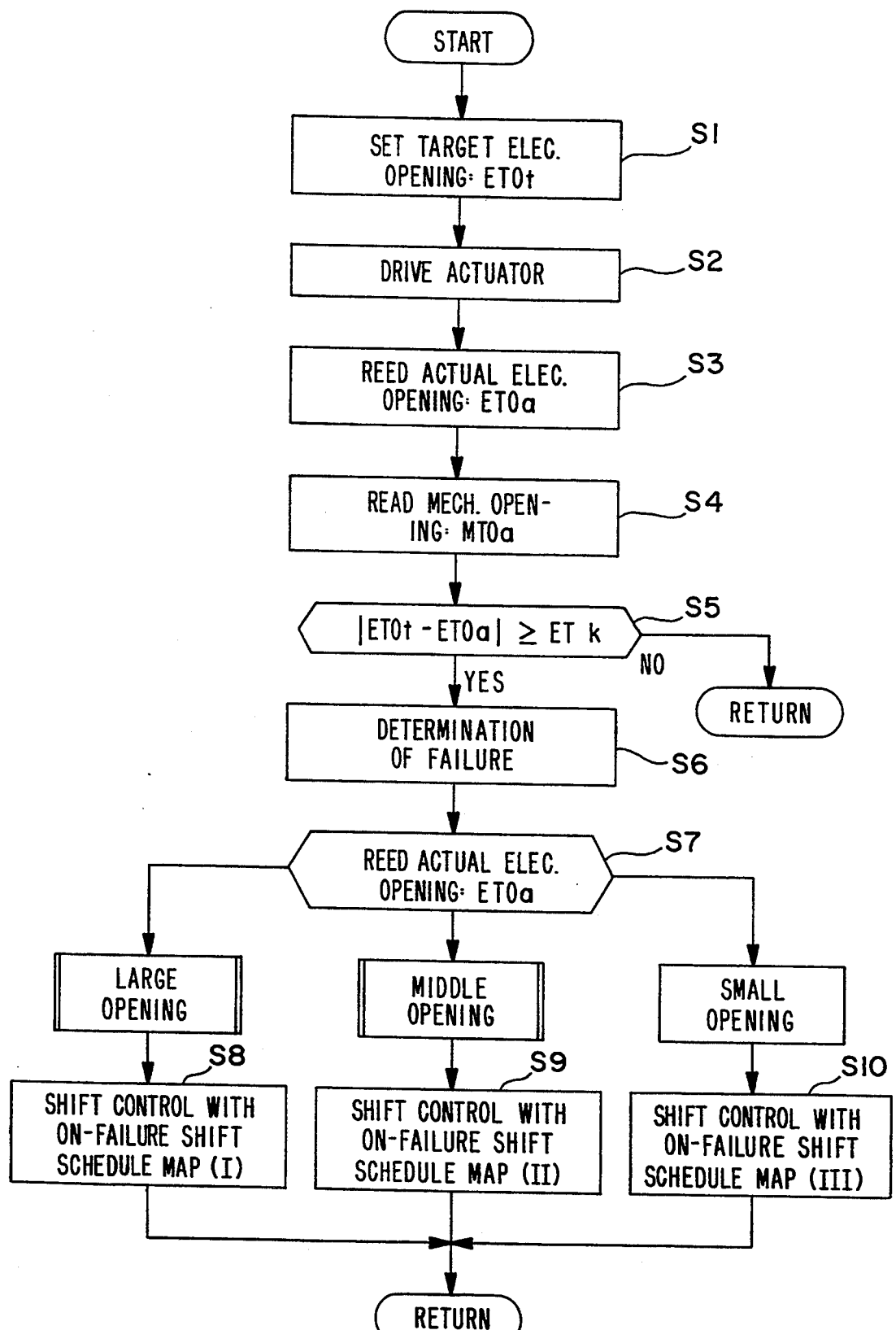
FIG. 11 is a flow chart illustrating a transmission shift control when the electric throttle valve operationally fails.

Referring to FIG. 11, whenever the routine is called and commenced, the normal gear shift schedule map shown in FIG. 6 is selected. Thereafter, at step S1, a target opening (ETOt) of the electric throttle valve 20 is established according to a target gear to which the automatic transmission 2 is to be shifted and which is determined based on a vehicle driving condition with reference to the normal gear shift schedule map. After the actuator 19 is actuated so as to regulate the electric throttle valve 20 to the target opening (ETOt) at step S2, a practical opening (ETOa) of the electric throttle valve 20 is read in at step S3. Subsequently, an opening (MTOa) of the mechanical throttle valve 18 is read in at step S4.

At step S5, a first decision is made as to whether or not the difference between the target and practical openings (ETOt) and (ETOa) of the electric throttle valve 20 exceeds a specified value (ETk). If the answer to the decision is "NO," this indicates an assumption that there is no functional failure of the electric throttle valve 20, then gear shifting is resumed with the ordinary gear shift schedule map.

However, if the answer to the decision made at step S5 is "YES," it is ascertained at step S6 that a functional failure has occurred with respect to the electric throttle valve 20. Then, a determination is made at step S7 as to in which region of openings, namely small, middle or large opening region, the practical opening (ETOa) of the failed electric throttle valve 20 is accidentally held. As a result of the determination concerning opening regions made at step S7, if the practical opening (ETOa) of the failed electric throttle valve 20 is determined to be in the large opening region, then, at step S8, the normal gear shift schedule map is substituted by the on-failure gear shift schedule map (I) shown in FIG. 7 for automatic shifting of the automatic transmission 2. As was previously described, in this instance, the third to fourth upshifting is prevented. On the other hand, if the practical opening (ETOa) of the failed electric throttle valve 20 is determined to be in the small opening region, then, at step 9, a substitution is made for the normal gear shift schedule map with the on-failure gear shift schedule map (II) shown in FIG. 8. In this instance, downshifting of the automatic transmission 2 is restricted, in particular, in the region of high vehicle speeds. If the practical opening (ETOa) of the failed electric throttle valve 20 is determined to be in the middle opening region, then, at step S10, the normal gear shift schedule map is replaced with the on-failure gear shift schedule map (III) shown in FIG. 9. In this instance, automatic shifting of the automatic transmission 2 is accomplished in accordance with shift schedules based upon composite openings of the opening of the mechanical throttle valve 18 and the opening of the electric throttle valve 20, and vehicle speeds. This on-failure gear shift schedule map (III) restricts upshifting from the third gear to the fourth gear in the region of high engine loads, and prevents unsuitable downshifting in the region of high vehicle speeds, so as to provide relatively stable automatic shifting of the automatic transmission 2.

As apparent from the above, if there is an operational failure of the electric throttle valve 20, shifting of the automatic transmission 2 is appropriately restricted. Particularly, if the electric throttle valve 20 is operationally impeded t middle openings, through the substitution with the on-failure gear shift schedule map (III) for the regular gear shift schedule map, automatic shifting of the automatic transmission 2 is accomplished on the basis of the composite opening of an opening of the mechanical throttle valve 18 and an opening of the failed electric throttle valve 20, and a vehicle speed. The utilization of the composite opening, which reflects not only the opening of the mechanical throttle valve 18 but also the opening of the failed electric throttle valve 20, enables the execution of gear shift control of the automatic transmission 2 responding to engine output torque with a accuracy higher than the conventional automatic transmission shift control which is executed based the opening of only the mechanical throttle valve 20 and the speed of vehicle. In other words, even when the electric throttle valve 20 is operationally impeded, gear shift control is accomplished with relative stability, and it is possible to minimize or prevent any negative influence on the operation of the vehicle.

Especially, if the electric throttle valve 20 is designed and adapted to have openings established differently for the possible gears of the automatic transmission 2, when it is operationally impeded at middle openings, then through the accomplishment of gear shift control on the basis of a composite opening and a vehicle speed, the automatic transmission 2 is enabled to shift in accordance with engine output torque.

In addition, particularly, if the electric throttle valve 20 is designed and adapted to open smaller than the mechanical throttle valve 18 in order to restrict engine output, when it is operationally impeded at middle openings, then through the accomplishment of gear shift control on the basis of a composite opening and a vehicle speed, the automatic transmission 2 is prevented from suffering deterioration of feelings in gear shifting brought about through the lack of effective limitation on engine output attributive to operational impediment of the electric throttle valve 20 and provides effective stable shift control.

Furthermore, if the electric throttle valve 20 is designed and adapted to be restricted in opening so as to limit the output of the engine 1 less than a predetermined torque when the automatic transmission 2 is in the overdrive mode, when it is operationally impeded at middle openings, shifting up of the automatic transmission 2 into the overdrive mode in the range of high engine loads is prohibited. Accordingly, even if the electric throttle valve 20 is operationally failed, the transmission of excess torque, which is beyond the torque transmissive capacity of the clutch if the automatic transmission 2 is in the overdrive mode, is positively prevented.

Although, in the power train control system of the present invention described above, shifting of the automatic transmission 2 is controlled with the aid of the on-failure gear shift schedule map (III) on the basis of the composite opening of an opening of the mechanical throttle valve 18 and an opening of the failed electric throttle valve 20, and a vehicle speed only when the electric throttle valve 20 is operationally failed at middle openings. However, even if the electric throttle valve 20 is operationally failed at large openings or at small openings, through the appropriate application of the on-failure gear shift schedule map (III), shifting of the automatic transmission 2 is safely accomplished with measurably improved shift feelings.

It is also to be understood that although the present invention has been described in detail with respect to a preferred embodiment thereof, various other embodiments and variants may occur to those skilled in the art. Such other embodiments and variants fall within the scope and spirit of the invention and are intended to be covered by the following claims.

What is claimed is:

1. In combination, a power train of an automotive vehicle, an engine provided with a mechanical throttle valve and an electric throttle valve, a control system for said power train, and an automatic transmission having an overdrive mode, the combination comprising:

a mechanical throttle opening sensor for monitoring an opening of the mechanical throttle valve;

an electric throttle opening sensor for monitoring an opening of the electric throttle valve;

a speed sensor for detecting a vehicle speed; and automatic transmission shift control means for (1) detecting a failure of the electric throttle valve based on an electric throttle opening, (2) controlling shifting of the automatic transmission based on an electric throttle opening detected by said electric throttle opening sensor and the vehicle speed detected by said speed sensor when failure of the electric throttle valve is not detected, and (3) controlling shifting of the automatic transmission based on (a) a composite opening obtained from an electric throttle opening detected by said electric throttle opening sensor and a mechanical throttle opening detected by said mechanical throttle opening sensor, and (b) a vehicle speed detected by said speed sensor when failure of the electric throttle valve is detected.

2. A combination as defined in claim 1, wherein the electric throttle valve is changed in opening differently in accordance with gears into which the automatic transmission is shifted.

3. A combination as defined in claim 1, wherein, in each gear of the automatic transmission, an opening of the electric throttle valve is smaller than an opening of the mechanical throttle valve.

4. A combination as defined in claim 1, wherein said automatic transmission shift control means limits opening of the electric throttle valve so as to keep output torque of the engine less than a predetermined torque in the overdrive mode of the automatic transmission, and prohibits the automatic transmission from being shifted into the overdrive mode in a range of high engine loads when a failure of the electric throttle valve is detected.

* * * * *